United States Patent [19]

Maute et al.

[11] 4,279,511
[45] Jul. 21, 1981

[54] PHOTOMETRIC ABSORPTION DETECTOR

[75] Inventors: Alfred Maute, Holzgerlingen; Konrad Teitz, Pfinztal-Berghausen; Klaus Baier, Karlsruhe; Hans Heid, Bammental-Heidelberg, all of Fed. Rep. of Germany

[73] Assignee: Hewlett-Packard Company, Palo Alto, Calif.

[21] Appl. No.: 25,688

[22] Filed: Mar. 30, 1979

Related U.S. Application Data

[63] Continuation of Ser. No. 840,437, Oct. 7, 1977, abandoned.

[30] Foreign Application Priority Data

Nov. 6, 1976 [DE] Fed. Rep. of Germany ....... 2651086

[51] Int. Cl.³ .............................................. G01J 3/42
[52] U.S. Cl. ................................... 356/328; 356/334
[58] Field of Search ................. 250/573, 576; 356/326, 356/328, 332, 334, 409–411, 436, 437, 440, 246

[56] References Cited

U.S. PATENT DOCUMENTS

| 2,436,104 | 2/1948 | Fisher et al. | 356/303 X |
| 2,572,119 | 10/1951 | Dieke | 356/303 X |
| 2,686,894 | 8/1954 | Mathieu | 356/373 X |
| 3,606,547 | 9/1971 | Iwahashi | 356/325 |
| 3,786,261 | 1/1974 | Tucker | 250/574 X |
| 4,012,147 | 3/1977 | Walfren | 356/326 |
| 4,030,828 | 6/1977 | Sonobe et al. | 356/334 X |

FOREIGN PATENT DOCUMENTS 2604666 8/1977 Fed. Rep. of Germany .
661497 11/1951 United Kingdom .

Primary Examiner—F. L. Evans
Attorney, Agent, or Firm—Stephen P. Fox

[57] ABSTRACT

A photometric absorption detector, in particular for the use in liquid chromatography is provided, in which a test cell is penetrated by the rays emitted by a light source and in which the absorption of certain wave length ranges of the light by the sample is recorded by means of a photodetector arrangement. Means for the spectroscopical dispersion of the light emerging from the test cell are provided, and the photodetector arrangement can be displaced within the spectrum. There may be two independently displaceable photodetectors, one of which may be set to a measuring wave length, while the other one may be set to a reference wave length.

3 Claims, 2 Drawing Figures

PHOTOMETRIC ABSORPTION DETECTOR

Cross Reference to Related Application

This is a continuation, of application Ser. No. 840,437, filed Oct. 7, 1977, now abandoned.

BACKGROUND OF THE INVENTION

Photometric absorption detectors are used for determining the optical density of fluid and solid materials as a function of constant or variable light wave lengths. This permits, for instance, the determination of the presence and quantity of substances in a sample, in particular in a chromatographically separated sample in the process of liquid chromatography.

In the process of liquid chromatography, the components of a test mixture leave the separating column in the solvent flow in a chronological order of zones and are fed through a capillary tube into the photometric absorption detector. Given a specific concentration, a homogeneous distribution and a pre-determined layer thickness, the optical density of the individual components is dependent upon the light wave length (absorption characteristics). If the highest possible sensitivity is to be reached in determining any given component of the test mixture, the measurement of the optical density must be carried out with the wave length set to the absorption maximum. On the other hand, it may in certain cases be desirable to suppress any given component in the chromatogram. In this case, the wave length must be set to an absorption minimum for the component in question.

However, there are certain difficulties encountered in adapting the measuring wave length during a chromatogram to the absorption characteristics of the respective components, as in certain separating processes, the time interval between the components leaving the column is often limited to a few seconds only. It is difficult and sometimes even impossible to adapt the wave length in a time as short as this, the more as the moment of the adjustment must be very exactly defined, too. This difficulty is still aggravated by the fact that the absorption detector must be re-adjusted following each adjustment to bring the output signal as exactly as possible to a level equal to that given before the adjustment, in order to avoid discontinuities of the recording. In addition, certain cases reqire also an adjustment of the sensitivity of the detector in order to maintain a uniform format for the peaks of different components in the chromatogram.

A further problem of the known absorption photometers, spectral photometers and photometric detectors for liquid chromatography lies in the fact that the base line is instable, i.e. that the output signal of the detector does not remain constant during times in which no sample is in the measuring cell. In liquid chromatographs, such trouble is mainly caused by the flow of the solvent through the very small measuring cell, but also by intensity fluctuations of the light source.

It is true that interfering influences to the output signal may be reduced by the particular optical construction and by the stabilizied operation of different components, such as light source and photo-detectors. However, in the case of detector arrangements for liquid chromatographs, which are required to exhibit a very high base line stability, it is very difficult to get the interfering influences under control. Moreover, it is a fact that in liquid chromatographs with only one flow channel from the sample input to the detector, the interferences resulting from the solvent flow cannot even be efficiently suppressed by a detector with two optical channels. For, in this case, the reference measuring cell must be inserted into the flow channel before the feed-in point of the sample, and as a result the interferences arising from the solvent flow will appear in the two measuring cells with a certain time lag, so that it will be impossible to achieve a complete compensation.

SUMMARY OF THE INVENTION

The present invention provides an absorption detector of the type described above, which can be easily adapted to the absorption characteristics of different components to be recorded and which can easily be adjusted.

According to the preferred embodiment of the invention a photometric absorption detector, in particular for the use in liquid chromatography, is provided, in which a test cell is penetrated by the rays emitted by a light source and in which the absorption of certain wave length ranges of the light by the sample is recorded by means of a photodetector arrangement. Means for the spectroscopical dispersion of the light emerging from the test cell are provided, and the photodetector arrangement can be displaced within the spectrum.

An optically multi-channel absorption detector, operating for instance with a reference and a measuring wave length, can be achieved by a photodetector arrangement comprising several individual detectors, which can be displaced independently of each other. Such an arrangement allows, for instance, easy and efficient stabilization of the base line, since on the one hand it requires only a single measuring cell, whereas on the other hand there exists no timelag between the interferences encountered in the reference and in the measuring channel.

The means for the three-dimensional spectral resolution of the light consists preferable of a concave reflection diffraction grating. In this case, the individual detectors can be displaced along a common straight line in the field of first order of the spectrum produced by the grating.

Preferably, two individual detectors are used which can be adjusted to the measuring wave length and to a reference wave length, respectively. The adjustment may at any time be optimally adapted to the chromatogram to be recorded.

In the case of sample components with absorption characteristics, which do not contain any distinct transparent zones or absorption minima in the pre-determined wave length range of the detector, it may be convenient to cut off the optical reference channel and to use instead a purely mathematical reference absorption value simulating a suitable value which is beyond the given wave length range.

DESCRIPTION OF THE PREFERRED EMBODIMENTS

Figure 1:
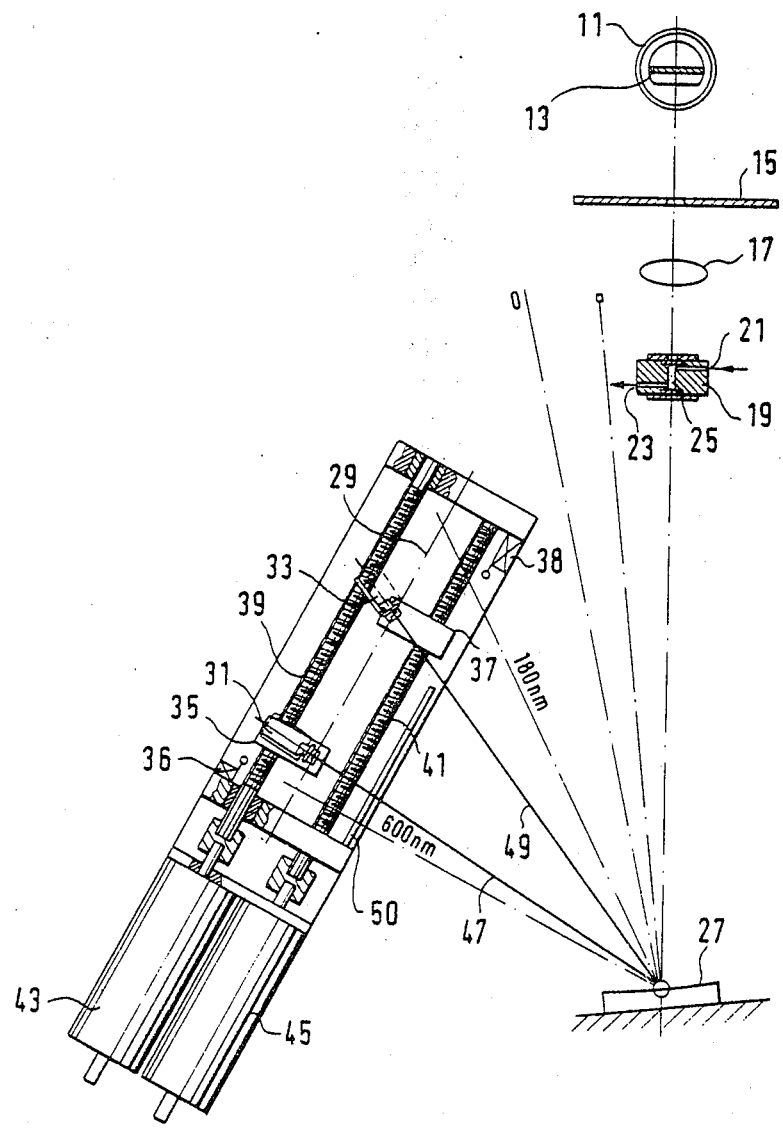
FIG. 1 shows a diagrammatic representation of the mechanical design of an absorption detector in accordance with the invention.

In FIG. 1, a light source 11, for instance a deuterium lamp is provided with a first diaphragm 13. The light emerging from the diaphragm 13 arrives via a second diaphragm 15 at a lens 17 which forms a scaled-down image of the diaphragm 13 in a bore 25 of a test cell 19 in such a manner that the radiation cone does not get into contact with the walls of the bore 25. The test cell 19 comprises an inlet opening 21 and an outlet opening 23 which may communicate, for instance, with the flow system of a liquid chromatograph.

The image formed in the bore 25 constitutes the input pupil of a monochromator formed by a concave reflection grating 27. On the grating 27, an image of the second diaphragm 15 is formed in the size corresponding to the size of the grating 27. Grating 27 deflects the different light wave lengths at different angles. In the present embodiment, the range limits, which are indicated in FIG. 1 by dash-dot lines, are 180 nm and 600 nm. These limits correspond to the field of first order. Within this field of first order, two photodetectors 31 and 33 are arranged to slide along a straight line 29.

Photodetectors 31 and 33 are mounted on sliding nuts 35 and 37 for pivoting movement about axes extending vertically in relation to the plane of the drawing. Sliding nuts 35 and 37 can be displaced in parallel relation to the straight line 29 by rotating the threaded spindles 39 and 41, which are driven by stepping motors 43 and 45. Guide rods 47 and 49 which can be pivoted at the grating 27 about an axis extending vertically to the plane of the drawing and which are seated for axial displacement in the photodetectors 31 and 35 keep photodetectors 31 and 33 constantly oriented towards grating 27. End switches 36 and 38 determine the left and/or right end position of the photodetector 31 and 33, respectively.

One of the two detectors 31 and 33 may be used for scanning a measuring wave length, whereas the other one may be set to a reference wave length. Thus, a two-channel optical arrangement is provided in spite of the fact that there is only one measuring cell and a single light beam passing there through. In the long-wave range, a filter 50 is additionally provided for suppressing the existing field of second order.

Figure 2:
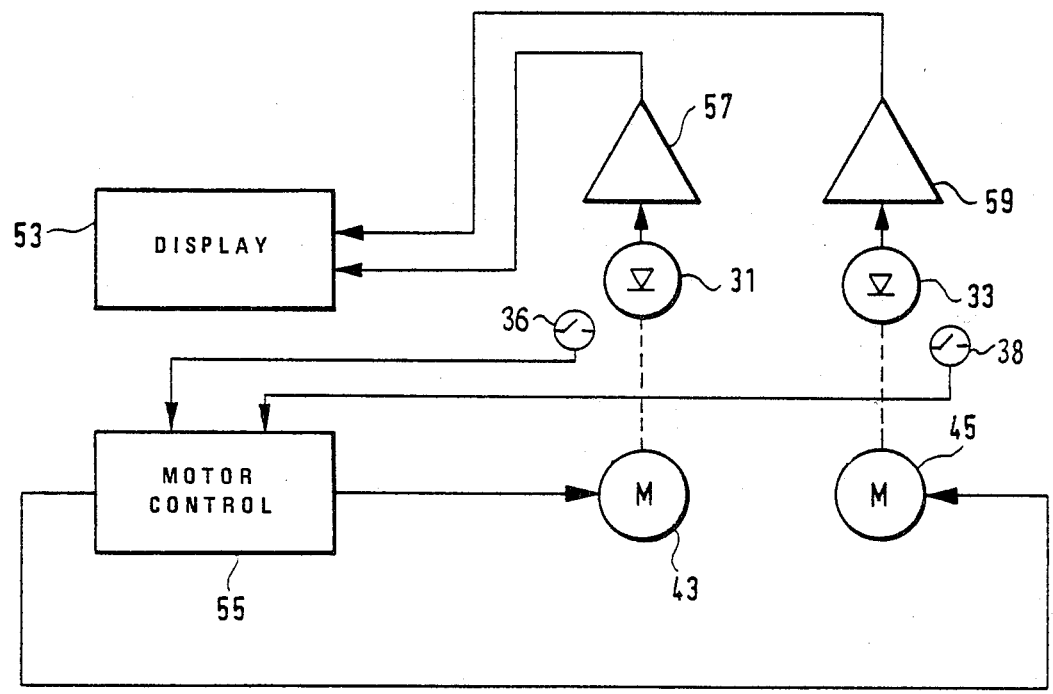
FIG. 2 shows the block diagram of the connection of the absorption detector shown in FIG. 1 to display and control units.

As shown in FIG. 2 motor inputs and detector outputs may be connected to control and evaluating circuits, respectively. In the example shown photodetector 31 is connected to a preamplifier 57, and photodetector 33 is connected to a preamplifier 59. The output signals of the preamplifiers 57 and 59 are fed to a display unit 53 for displaying the intensities of the light impinging on the photodetectors 31 and 33, respectively.

Step motors 43 and 45 are driven by a motor controlled circuit 55. This control circuit may be a usual pulse generator capable of delivering positive and negative pulse trains where the number of pulses of said pulse trains is manually adjustable. If desired, end switches 36 and 38 may be connected to control circuit 55, so that movement of the photodetectors 31 and 33 is stopped when they reach their end positions.

It should be noted that control and evaluating circuits are not part of the invention. The photometric absorption detector according to the invention can be implemented in any suitable instrument circuitry capable of evaluating the detector output signals and of driving the step motors. Of course, operation under program control is also possible.

What we claim is:

1. A photometric absorption detector comprising:
    a light source including a first diaphragm for emitting a light beam from the diaphragm;
    a test cell disposed in the light beam and having a bore for receiving a sample of material;
    a lens disposed in the light beam between said light source and said test cell for forming a scaled-down image of said first diaphragm in the bore of said test cell, said image being spaced apart from the interior walls of said bore;
    means for spectroscopically dispersing the light emerging from the test cell;
    a second diaphragm disposed in the light beam between said light source and said lens for forming an image of said second diaphragm on said dispersing means;
    photodetector means in the field of the dispersed light for detecting the absorption of certain wave length ranges of the light due to the sample material, said photodetector means including at least two individual detectors independently displaceable with respect to one another; and
    means for selectively displacing each of said individual detectors within said field of dispersed light so that different wave length ranges can be detected, said displacing means including an independent drive mechanism for each detector.

2. A detector as in claim 1, wherein said means for spectroscopical dispersion of the light comprises a cncave reflection diffraction grating and wherein the individual detectors can be displaced along a common straight line in the field of first order of the spectrum generated by the said grating.

3. A detector as in claim 2, wherein two individual detectors are used, which can be set to a measuring wave length and to a reference wave length, respectively.

* * * * *

UNITED STATES PATENT AND TRADEMARK OFFICE
CERTIFICATE OF CORRECTION

PATENT NO. : 4,279,511
DATED : July 21, 1981
INVENTOR(S) : Alfred Maute, et al.

It is certified that error appears in the above-identified patent and that said Letters Patent are hereby corrected as shown below:

On the title page at line "[73]", the assignee should be listed as -- Hewlett-Packard GmbH, Boblingen, Germany --.

Signed and Sealed this

Tenth Day of November 1981

[SEAL]

*Attest:*

*Attesting Officer*

GERALD J. MOSSINGHOFF

*Commissioner of Patents and Trademarks*